April 13, 1926. 1,580,801
H. H. BARSBY
BRAKE FOR BAGGAGE TRUCKS
Filed Nov. 7, 1925
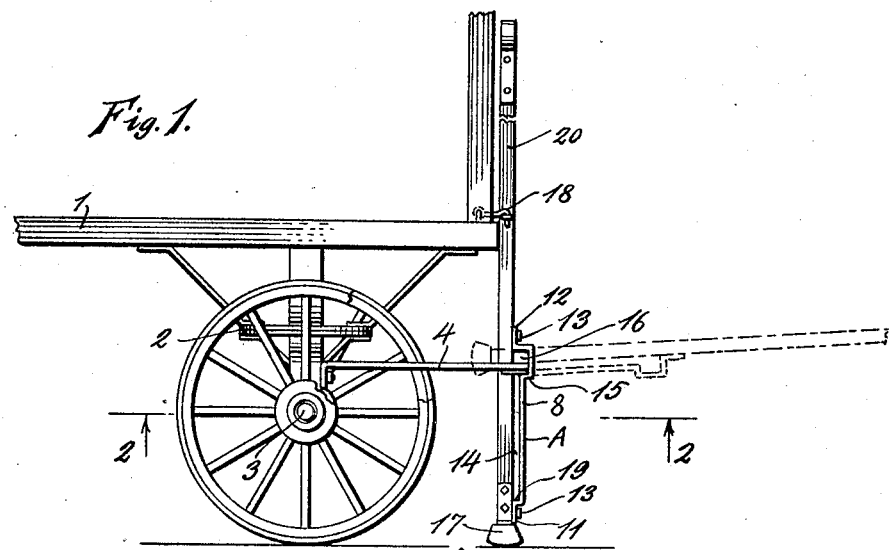
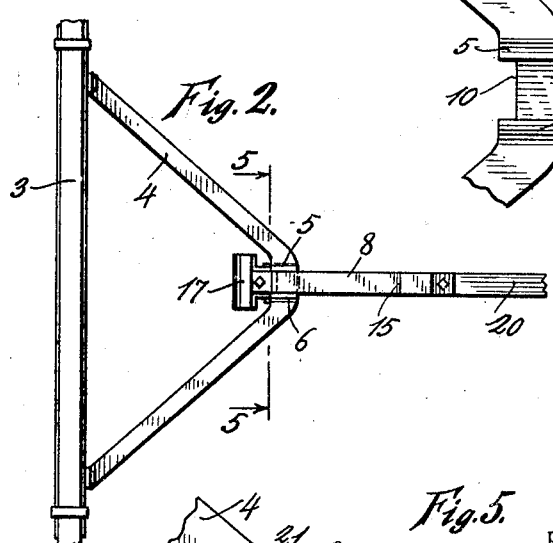
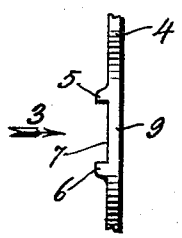
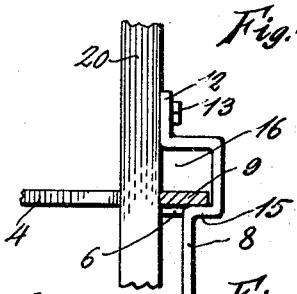
Inventor
Harry H. Barsby.
By  A. J. O'Brien
Attorney Patented Apr. 13, 1926.

1,580,801

UNITED STATES PATENT OFFICE.

HARRY H. BARSBY, OF DENVER, COLORADO.

BRAKE FOR BAGGAGE TRUCKS.

Application filed November 7, 1925. Serial No. 67,559.

*To all whom it may concern:*

Be it known that I, HARRY H. BARSBY, a citizen of the United States, residing at the city and county of Denver and State of Colorado, have invented certain new and useful Improvements in Brakes for Baggage Trucks; and I do declare the following to be a full, clear, and exact description of the invention, such as will enable others skilled in the art to which it appertains to make and use the same, reference being had to the accompanying drawings, and to the characters of reference marked thereon, which form a part of this application.

This invention relates to improvements in brakes for baggage trucks.

It is well known that baggage trucks of the type employed by railways for receiving baggage from baggage cars and transporting the same, are often the cause of serious accidents and damages due to the fact that they will be blown off from the platform by strong winds or will become accidentally moved to positions where they should not be as the attendant frequently forgets to block the wheels.

To obviate such accidents, it has been proposed to apply to the truck some form of brake that will be automatically set when the truck is not in use or some sort of brake that can be conveniently set when the attendant no longer desires to employ the truck. It has been found that these brakes for one reason or another are unsatisfactory and they have therefore failed to meet the requirements of the situation. It is the object of this invention to produce a brake of a very simple construction that can be applied to existing trucks without necessitating any changes in the construction thereof and which will not add materially to the cost of the truck.

My invention briefly described consists in attaching to the front axle of a truck a yoke member to which the tongue is slidably connected. When a truck is in use, the tongue extends in the usual position, but when the truck is not in use the tongue is moved rearwardly and then rotated until it assumes an upright position with its lower end resting upon the platform and forming a friction brake, which is sufficient to prevent the truck from being moved accidentally or by winds of the usual severity.

In order to describe my invention so that its construction and operation can be more readily understood, I shall have reference to the accompanying drawing in which the preferred embodiment is shown and in which:

Fig. 1 shows a side elevation of the front end of a truck; the position of the tongue when it serves the function of a brake being shown in full lines and the position when in use being indicated by dot and dash lines;

Figure 2 is a sectional view taken in the direction of line 2—2, in Figure 1 and shows the relationship of the tongue and the yoke piece when the tongue occupies its operative position;

Fig. 3 is a detail of the yoke piece looking in the direction of arrow 3 in Fig. 4;

Fig. 4 is a side elevation of the part shown in Figure 3 looking in the direction of arrow 4 in Figure 3;

Fig. 5 is a section taken on line 5—5, Figure 2;

Fig. 6 is a vertical section through the yoke piece and shows the manner in which the tongue is held in position when serving as a brake; and Fig. 7 is a detail showing a slightly modified form of construction.

In the drawing numeral 1 designates the platform of the truck and 2 the fifth wheel to which the front axle 3 is pivotally secured in the old and well known manner. Secured to the front axle is a yoke piece 4 which is of a shape indicated in Figure 2. At the front end of this yoke piece where the two sides join, it is provided with two spaced flanges 5 and 6 which form a guideway 7 that cooperates with a strap 8 that is secured to the tongue in the manner shown in Figure 1. The central portion 9 of the yoke member is somewhat narrower than the length of the flanges 5 and 6 so as to form a notch or recess 10 in the manner clearly shown in Figure 3. The strap member 8 which is secured to the tongue has its ends 11 and 12 perforated for the reception of bolts or screws 13 by means of which it is secured to the tongue. The portion indicated by letter A is spaced away from the surface of the tongue so as to form a slot 14 of sufficient thickness to receive the part 9 of the yoke member. Near the upper end of this connecting strap is an offset beginning at point 15 and extending to the upper end thereof so as to provide a space 16 whose width is sufficient to receive the part 9 when the several parts are in the position shown in Figure 6.

Secured to the lower end of the tongue is a weight 17 of metal or other suitable material which has sufficient mass to produce the necessary friction against the surface of the platform for holding the truck. When the truck is not in use, the tongue is moved back into the position shown in Figure 1 and held in this position by means of a hook 18. It will be obvious that with the end of the tongue resting on the surface of the platform, considerable resistance to movement will be produced. This can be increased by providing the lower end of weight 17 with some friction substance as rubber or with a number of sharp prongs which cut into the wood of a wooden platform, or the lower surface of the weight 17 may merely be roughened. When the truck is to be used the tongue is rotated from the vertical position into a substantial horizontal position and then pulled forwardly until the transverse part 19 of member 8 enters into the notch 10. The space between the inner surfaces of the flanges 5 and 6 or the width of the channel 7 is preferably just sufficient to receive the connecting strap 8 so that when the parts are in the position indicated by dotted lines in Figure 1 and shown in full lines in Figure 2, there will be very little sidewise movement of the tongue 20, wherefore, the truck can be steered as well as if the tongue were secured to it in the ordinary manner.

In Figure 7 I have shown a modified form in which, instead of having the flanges 5 and 6 integral in the manner shown in Figures 3 and 4, angle irons 5ª and 6ª are secured to the yoke 4 by means of rivets 21. This construction is the mechanical equivalent of that shown in the other figures, but simplifies the manufacture to some extent and may be preferred by some to the construction shown in the other figures.

It will be apparent from the above description that I require no change whatever to be made in the construction of the truck, but merely attach the yoke member to the front axle and attach the strap member 8 to the tongue. The parts have been so designed that the shape and size of the tongue 20 is immaterial and the tongue that is now employed can be used in my improved construction by merely adding to it the strap 8 and the weight 17.

Having now described the invention, what I claim as new is:

1. A safety brake for baggage trucks comprising, in combination, a yoke member having its ends attached to the front axle, a tongue slidably connected with said yoke and means permitting said tongue to be rotated with respect to the yoke member so as to assume a substantially vertical position and to have its lower end supported upon the surface that supports the truck.

2. A safety brake for baggage trucks provided with a front axle that may be rotated about a vertical pivot, a yoke member having two arms of substantially the same length and connected intermediate their ends by a straight portion, a tongue, a connecting device secured to the tongue for connecting it with the yoke member, said connecting device having a portion thereof spaced from the tongue a distance substantially equal to the thickness of the yoke member and another portion spaced from the tongue a distance substantially equal to the width of that portion of the yoke member that joins the arms and means for holding the tongue against movement in the plane of the yoke member when in operative position.

3. A brake for baggage trucks, comprising, in combination, a substantially V-shaped yoke member adapted to have its ends connected with a pivoted axle, a tongue and means for securing the tongue to the yoke member so as to permit it to occupy a position parallel with the plane of the yoke and to be moved into a position at right angles to the plane of the yoke, said means permitting a sliding of the tongue with respect to the yoke member when passing from one position to the other.

4. A brake for baggage trucks comprising, in combination, a yoke member supported on the truck, a tongue and means for connecting the tongue to the yoke so that it can be moved from a position in which it is substantially parallel to the plane of the yoke and into a position in which it is substantially perpendicular to the plane of the yoke, said means comprising a member secured to the tongue and embracing a portion of the yoke, said member having parts thereof lying in separated planes so as to be spaced different distances from the surface of the tongue.

5. A brake for baggage trucks, comprising, in combination, a yoke member supported on the truck, a tongue, means for connecting the tongue to the yoke so that it can be moved from a position in which it is substantially parallel to the plane of the yoke and into a position in which it is substantially perpendicular to the plane of the yoke, said means comprising a member secured to the tongue and embracing a portion of the yoke, said member having parts thereof lying in separate planes so as to be spaced different distances from the surface of the tongue, and means for preventing the tongue from moving in the plane of the yoke.

6. A safety device for baggage trucks comprising, in combination, a V-shaped bracket having two spaced flanges near its vertex, said flanges being parallel with the bisector of the angle between the two arms of the bracket, a tongue, a guide member attached to the tongue and embracing that portion of the bracket between the flanges, said guide member having a portion thereof spaced from the tongue a distance equal to the thickness of the embraced portion of the bracket and another portion spaced from the tongue a distance equal to the width of the embraced portion of the bracket whereby the tongue may be rotated with respect to the bracket.

In testimony whereof I affix my signature.

HARRY H. BARSBY.